INVENTOR.
RENO V. BENAGLIO
RAYMOND J. NYMBERG
BY
ATTORNEY

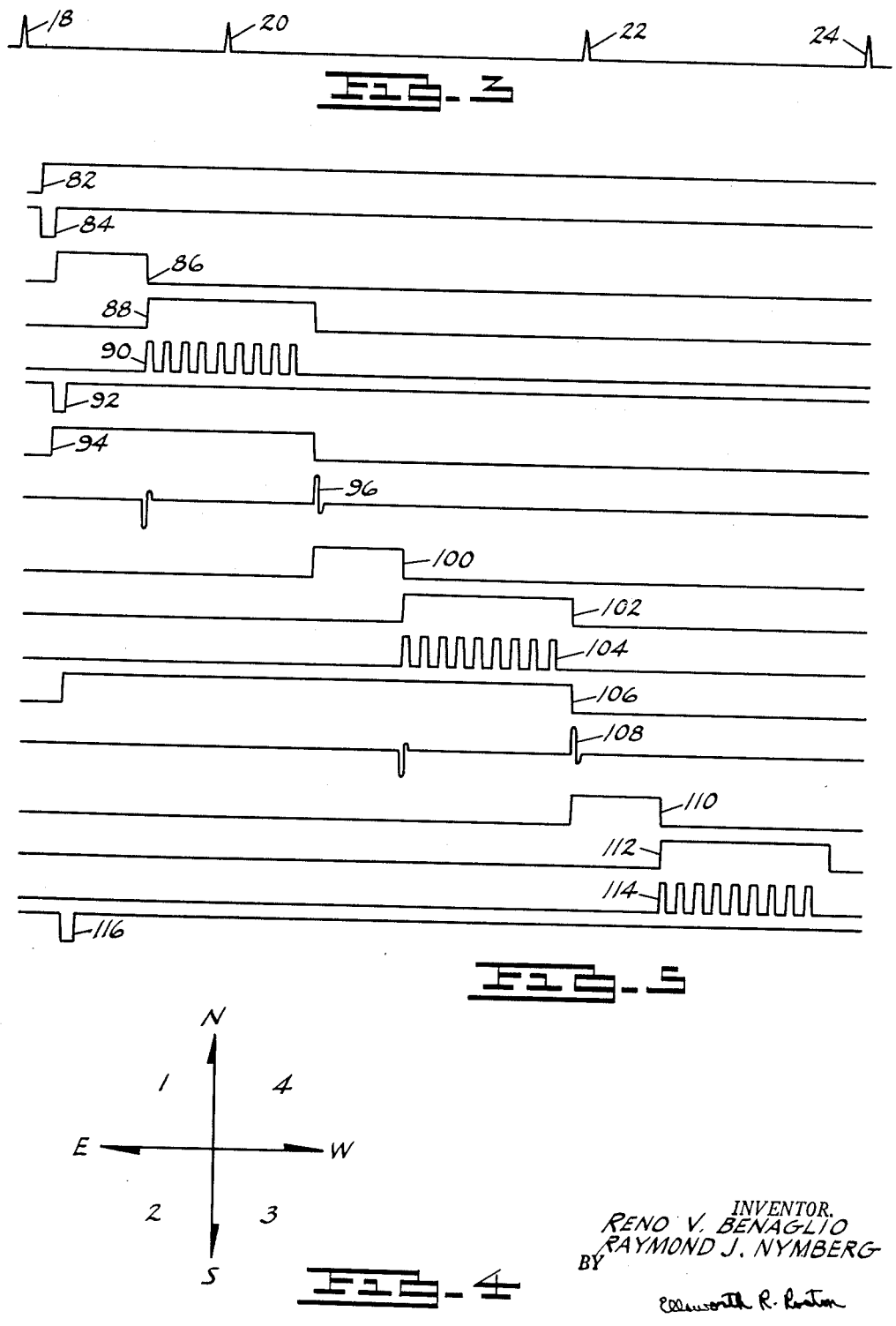

Patented Jan. 13, 1953

2,625,600

UNITED STATES PATENT OFFICE 2,625,600

DECODING INFORMATION TRANSLATOR

Reno V. Benaglio and Raymond Nymberg, Detroit, Mich., assignors to Bendix Aviation Corporation, Detroit, Mich., a corporation of Delaware Application May 3, 1951, Serial No. 224,414

8 Claims. (Cl. 177—351)

This invention relates to a translator for decoding information concerning a variable quantity. More particularly, the invention relates to a translator for converting coded information concerning the angular position of a variable quantity into a plurality of signals providing a definite indication of the angular position of the quantity from a fixed reference.

Information relating to various meteorological conditions, such as air temperature, air pressure, wind velocity and wind direction are considered important in determining the future weather conditions in a particular locality. To obtain this information, suitable equipment is carried by a rocket to an altitude of approximately 100,000 feet and is then released from the rocket for slow descent by parachute to the ground. During its descent, the equipment measures the different meteorological conditions and converts them into a coded form which can be conveniently transmitted to a central station on the ground for decoding, recording and subsequent analysis.

One of the main problems involved in obtaining such information is the conversion of the meteorological information into a coded form which can be easily and quickly decoded at the ground station without any appreciable loss in accuracy. This is especially true in the case of wind direction, which involves the conversion of an angular quantity into a coded form similar to that used for such linear conditions as air temperature and air pressure.

This invention provides a system for operating in conjunction with air-borne equipment which converts an angular quantity, such as wind direction, into a plurality of pulses spaced from one another by periods of time providing an indication of the quadrant in which the quantity is located and of the position of the quantity in the quadrant. The system operates at a ground station to reconvert the time period between each pair of successive pulses transmitted from the air-borne equipment into a plurality of signals proportional to the period. The different pluralities of signals are then combined in a predetermined manner to provide an accurate and simple indication of the angular position of the quantity with respect to a fixed reference.

An object of this invention is to provide a system for indicating the angular position of a variable quantity relative to a fixed reference.

Another object is to provide a system of the above character for operating on a sequence of pulses spaced by time periods indicative of the quadrant in which a variable quantity is located and of the position of the quantity in the quadrant to convert the sequence into a definite indication of the angular position of the quantity with respect to a fixed reference.

A further object is to provide a system of the above character for converting a coded indication of the angular position of a variable quantity into pluralities of signals proportional to the values of different digits representative of the angular position. For example, when the quantity is 275° from a reference of true north, three pluralities of 2, 7 and 5 signals may be produced to indicate the values of successive digits in the measurement.

Other objects and advantages will be apparent from a detailed description of the invention and from the appended drawings and claims.

In the drawings:

Figure 3 illustrates a typical sequence of pulses produced by the system shown in Figure 2;

Figure 1:
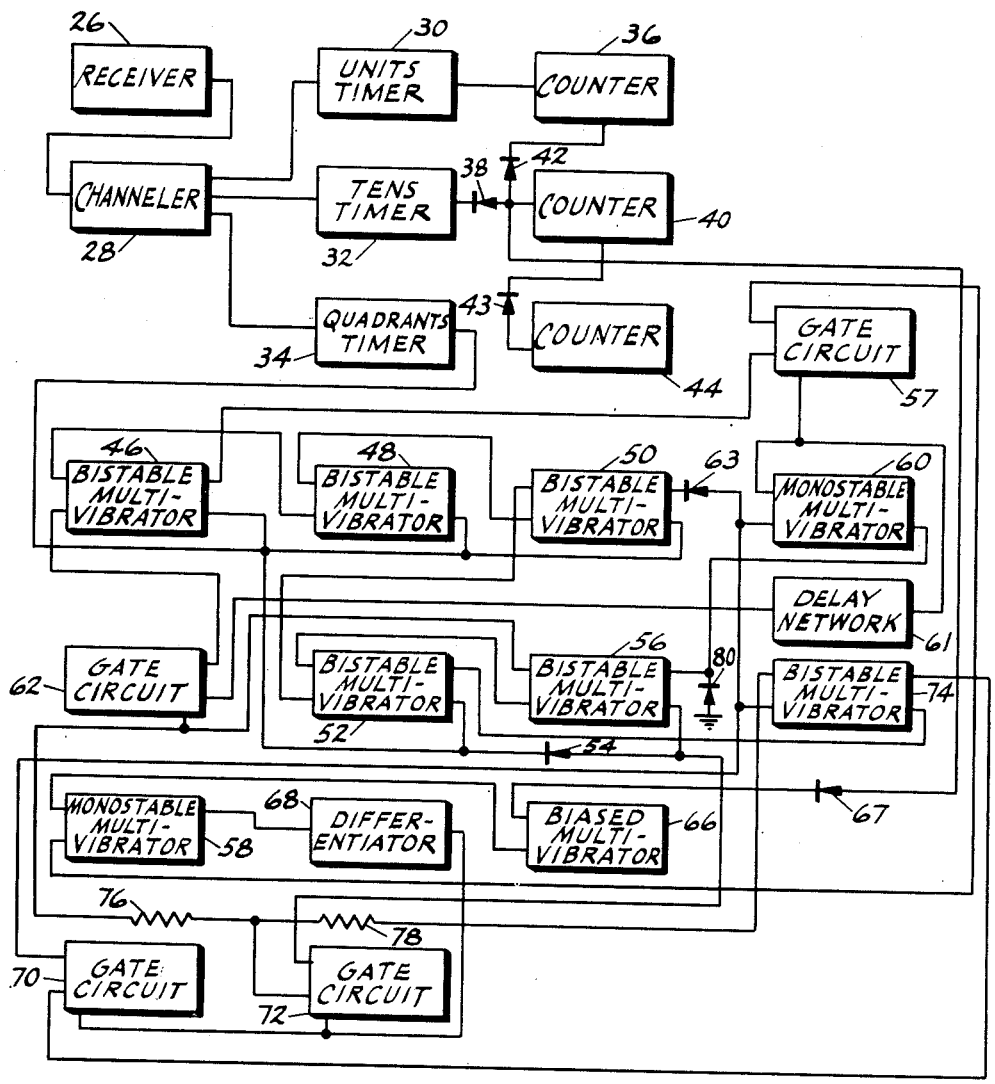
Figure 1 is a schematic diagram, essentially in block form, of a system for decoding a plurality of coded pulses which provide an indication of the angular position of a variable quantity.
Figure 2:
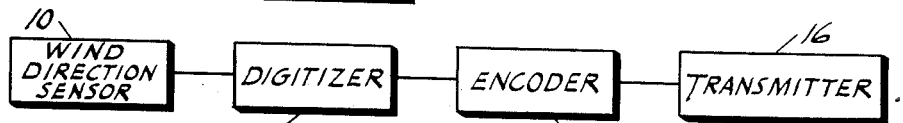
Figure 2 is a simplified schematic diagram, essentially in block form, of a system for providing the coded sequence of pulses.

Figure 4 further illustrates the time relationship between certain pulses in each sequence produced by the system shown in Figure 2; and Figure 5 illustrates voltage wave forms at strategic terminals in the embodiment of the invention shown in Figure 1.

A system for converting a measurement of the direction of an angular quantity, such as wind direction, into a sequence of coded pulses and for transmitting the pulses is shown in Figure 2. In simplified form, the system includes a sensor 10 for determining the direction of the wind, a digitizer 12, an encoder 14 and a transmitter 16 connected in cascade arrangement. The sensor 10 may be of a conventional construction and the digitizer 12 and encoder 14 may be similar to that disclosed in co-pending application Serial No. 183,717, filed September 8, 1950, by Charles A. Piper.

When a measurement indicative of the angular direction of the wind relative to a reference such as due north is obtained by the sensor 10, the digitizer 12 operates to convert the measurement into a plurality of voltages which together constitute an indication of the angular value.

Thus, the digitizer produces a voltage which indicates the quadrant in which the quantity is located and a further pair of voltages which are proportional to the values of the digits indicating the particular direction of the wind in the quadrant.

For example, if the wind direction is towards the southeast at an angle of 27° from due east, a voltage of 2 volts is produced to indicate that the wind direction is in the second quadrant relative to the reference of due north, the different quadrants and the voltages produced to indicate these quadrants being illustrated in Figure 4. Two further voltages of 2 and 7 volts are produced to indicate the values of the tens and units digits which together specifically point out the direction of the wind in the second quadrant. Similarly, when the wind is blowing towards the northwest at an angle of 35° from due west, a voltage of 4 volts is produced to indicate the northwest quadrant and voltages of 3 and 5 volts are produced to indicate the values of the tens and units digits which pinpoint the exact direction of the wind in the quadrant.

The encoder 14 converts the voltages produced by the digitizer 12 into pulses spaced by periods of time proportional to the voltages and the transmitter 16 sends these pulses to the system shown in Figure 1. For example, with 30 microseconds representing each integer in a digit, three pulses respectively spaced from one another by 60 and 210 microseconds are transmitted to indicate in coded form a wind direction of 27° from due east in the southeast quadrant. A fourth pulse spaced from the third pulse by 60 microseconds is also transmitted to show that the wind is in the second, or southeast, quadrant. Similarly four pulses respectively spaced by periods of 90, 150 and 120 microseconds indicate in code that the wind is blowing towards the northwest at an angle of 35° from due west. The four pulses sent out in a typical sequence by the transmitter 16 are illustrated at 18, 20, 22 and 24 in Figure 3.

The pulses transmitted by the system shown in Figure 2 are received and decoded by the system shown in Figure 1 to provide a positive indication of the direction of the wind from a due north reference. The system includes a receiver 26 connected to a channeler 28, the output of which is in turn introduced to a plurality of timers 30, 32 and 34. The output of the timer 30 is connected to a counter 36 and the output side of the timer 32 is connected through a crystal diode 38 to a counter 40. A terminal of the counter 36 is connected through a crystal diode 42 to the input terminal of the counter 40 to provide a carry over operation from the counter 36 to the counter 40 upon a full decimal count of "10" in the counter 36. Similarly, a terminal of the counter 40 is connected through a crystal diode 43 to the input terminal of a counter 44 to provide a carry over operation when the counter 40 has a full decimal count of "10".

Connections are made from the output side of the timer 34 to the grids of the right tubes in bistable multivibrators 46, 48, 50 and 52 and through a crystal diode 54 to the grid of the right tube in a bistable multivibrator 56. The plates of the left tubes in the multivibrators 46, 48, 50 and 52 are connected to the grids of the left tubes in the multivibrators 48, 50, 52 and 56, respectively. The plate of the right tube in the multivibrator 46 is connected to the control grid of the triode in a gate circuit 57. The plate and cathode of the triode in the gate circuit 57 are respectively connected to the grid of the left tube in a multivibrator 58 and to the plate of the left tube in a bistable multivibrator 60. The plate of the left tube in the multivibrator 60 is also connected through a delay network 61 to the control grid of the triode in a gate circuit 62, and the grid of the left multivibrator tube is connected through a crystal diode 63 to the plate of the right tube in the multivibrator 50.

The plate of the left tube in the multivibrator 58 is in turn connected to the grid of the left tube in a biased multivibrator 66, the plate of which is connected to the input terminal of the counter 40 through a crystal diode 67. The plate of the right tube in the multivibrator 58 is connected to an input terminal of a differentiator 68, the output terminal of which is connected to the control grids of the pentodes in gate circuits 70 and 72.

The suppressor grid of the pentode in the gate circuit 70 is connected to the plate of the right tube in a bistable multivibrator 74 and the suppressor grid of the pentode in the gate circuit 72 is connected through resistances 76 and 78 to the plates of the left tubes in the multivibrator 56 and 74, respectively. The plate of the left tube in the multivibrator 56 is also connected to the cathode of the triode in the gate circuit 62, the plate of the triode being connected to the grid of the left tube in the multivibrator 46. The plate of the right tube in the multivibrator 56 is connected to the grid of the right tube in the multivibrator 60 and through a crystal diode 80 to ground.

Connections are made from the plate of the pentode in the gate circuit 72 to the grid of the right tube in the multivibrator 56 and from the plate of the pentode in the gate circuit 70 to the grids of the left tubes in the multivibrators 60 and 74. The grid of the right tube in the multivibrator 74 is connected to the plate of the right tube in the multivibrator 52.

The timers 30 and 32 are activated during the periods between successive pairs of pulses to produce pluralities of signals proportional to the values of the successive digits which together indicate the position of the angular quantity in its quadrant. For example, two signals are produced by the timer 32 to indicate the value "2" when a separation of 60 microseconds exists between the pulses 18 and 20 in Figure 2 and each 30 microsecond interval represents an integer. Similarly, during a 210 microsecond period between the pulses 20 and 22, seven signals are produced by the timer 30 to indicate the integer "7." Together, the signals produced by the timers 32 and 30 indicate that the direction of the wind or other angular quantity is 27° from the boundary of a particular quadrant. The information represented by the signals from each of the timers 30 and 32 is stored in the counters 36 and 40 until a complete sequence of pulses has been decoded, and the information is then released to typing circuits (not shown) for permanent recordation. The operation of timers and counters similar to those shown in Figure 1 is described in detail in co-pending application Serial No. 193,735, filed November 2, 1950, by Alexander Greenfield.

When the third pulse 22 in each sequence is received, it activates the timer 34 which then operates to produce negative signals at predetermined intervals, such as 30 microseconds, until the reception of the last pulse 24. The number of negative signals produced by the timer 34 actually corresponds to the quadrant representative of the wind direction or other angular quantity as illustrated in Figure 4. For example, two signals from the timer 34 may indicate the second, or southeast, quadrant and four signals the fourth, or northwest, quadrant.

The introduction of the first negative signal from the timer 34 to the grid of the normally conductive right tube in the multivibrator 46 causes the tube to become cut off. Since the grid of one tube in each multivibrator is connected to the plate of the other tube, the rise in the voltage on the plate of the right tube in the multivibrator 46 when the tube becomes cut off produces a similar rise on the grid of the left tube and causes the left tube to start conducting. A negative pulse then appears on the plate of the left tube in the multivibrator 46 and causes the normally conductive left tube in the multivibrator 48 to become cut off. Cutting off the left tube in the multivibrator 48 in turn causes the right tube in the multivibrator to start conducting.

As illustrated at 82 in Figure 5, the right tube in the multivibrator 48 continues to conduct until the introduction of a second signal from the timer 34. When the right tube in the multivibrator 48 becomes cut off, the left tube starts to conduct and produces a negative pulse on its plate which cuts off the normally conductive left tube in the multivibrator 50 and causes the right tube in the multivibrator to start conducting. The resultant negative pulse, designated at 84, on the plate of the right tube in the multivibrator 50 cuts off the left tube in the monostable multivibrator 60 for a predetermined period of time, such as 400 microseconds, and produces a positive pulse on the plate of the tube during this period, as illustrated at 86. At the end of the period 86, the left tube in the multivibrator 60 again starts to conduct and produces a negative pulse which appears on the cathode of the triode in the gate circuit 57. Since a positive pulse is produced on the control grid of the triode in the gate circuit 57 upon the introduction to the multivibrator 46 of the first signal from the timer 34, the triode conducts and produces a negative signal on its plate. This signal cuts off the normally conductive left tube in the multivibrator 58.

Since the multivibrator 58 is also monostable, the left tube remains cut off for a predetermined period of time, such as 850 microseconds, and during this period of time the tube supplies a positive pulse, illustrated at 88, to the biased multivibrator 66. Normally, only the right tube in the multivibrator 66 conducts because of the introduction of a negative bias to the grid of the left tube, but both tubes alternately conduct when the positive pulse 88 is introduced to the grid of the left tube. As illustrated at 90, nine signals are produced on the plate of the left tube in the multivibrator 66 during this period, and these signals are introduced to the counter 40 for addition to the signals from the timer 32. Since the production of nine signals by the multivibrator 66 in effect converts the second quadrant into nine sectors of 10° each and since the signals from the timer 32 in effect indicate by 10° steps the position of the angular quantity in its quadrant, the two pluralities of signals may be added together to produce a composite indication of the value of the tens digit. As previously disclosed, the number of signals introduced to the timer 30 is indicative of the units digit.

If the wind direction is actually in the second quadrant, only two signals are produced by the timer 34. With the wind direction in the third or fourth quadrants shown in Figure 4, further signals are produced by the timer 34. The third signal from the timer cuts off the right tube in the multivibrator 50 and causes a negative pulse to be produced on the plate of the left multivibrator tube when the tube starts to conduct. This negative pulse cuts off the normally conductive left tube in the multivibrator 52 and causes the right multivibrator tube to start conducting. The resultant negative pulse on the plate of the right tube in the multivibrator 52, illustrated at 92, cuts off the normally conductive right tube in the multivibrator 74, and causes a positive pulse, illustrated at 94, to be produced on the plate of the right tube in the multivibrator 74. This pulse is introduced to the suppressor grid of the pentode in the gate circuit 70.

Even after the introduction of the positive pulse 94 to its suppressor grid, the gate circuit 70 does not pass a signal until a positive signal is introduced from the differentiator 68 to the control grid of the pentode in the gate circuit. Such a positive signal, illustrated at 96 in Figure 5, is produced upon the differentiation of the trailing edge of the negative pulse from the right tube in the multivibrator 58, the negative pulse being complementary to the pulse 88. The positive signal 96 from the differentiator passes in an inverted state through the gate circuit 70 to the grid of the left tube in the multivibrator 74 and cuts off the tube, causing the right tube to conduct. The resultant negative pulse on the plate of the right tube in the multivibrator 74 prevents any further signals from passing through the gate circuit 70.

The signal 96 also passes in its inverted form to the grid of the left tube in the monostable multivibrator 60. The left tube in the multivibrator 60 is conducting when the pulse 96, inverted by its passage through the gate circuit 70, is introduced to it, since it is cut off only during the pulse 86. Thus, the inverted pulse 96 cuts off the left tube in the multivibrator 60 and produces a positive pulse 100 for substantially the same period of time as the pulse 86. At the end of pulse 100, the left tube in the multivibrator 58 produces a positive pulse 102 for substantially the same period of time as the pulse 88, and, during the pulse 102, the multivibrator 66 produces nine signals, illustrated at 104, which are introduced to the counter 40. These signals are added to the signals from the timer 32 in a manner similar to the signals 90 previously produced by the multivibrator 66.

Upon the introduction of a fourth signal from the timer 34, the right tube in the multivibrator 52 becomes cut off and the left tube starts to conduct, causing a negative pulse to appear on the plate of the left tube. This pulse cuts off the left tube in the multivibrator 56 and causes a positive pulse, illustrated at 106, to be introduced from the plate of the tube to the suppressor grid of the pentode in the gate circuit 72. Since the left tube in the multivibrator 74 is also cut off for part of this time, a positive pulse is also introduced from this tube to the suppressor grid of the pentode in the gate circuit 72. The combination of the two positive pulses biases the suppressor grid of the pentode sufficiently positive so that a positive signal on the control grid may pass through the tube.

The positive signal on the control grid of the pentode in the gate circuit 72 is produced when a differentiation is made of the trailing edge of the negative pulse from the right tube in the multivibrator 58, this pulse being complementary to the positive pulse 102 from the left tube. The positive signal from the differentiator 68, illustrated at 108, passes through the gate circuit 72 and cuts off the right tube in the multivibrator 56 in case no further pulses are introduced from the timer 34. By cutting off the right tube in the multivibrator 56, a negative pulse is produced on the plate of the left tube in the multivibrator to prevent any further signals from passing through the gate circuit 72.

Although the inverted signal 108 is introduced to the grid of the right tube in the multivibrator 56, it is prevented from reaching any of the multivibrators 52, 50 and 48 because of the blocking action provided by the crystal diode 54. Furthermore, the negative trailing edge of the pulse 106 from the multivibrator 56 is prevented from acting on the left tube in the multivibrator 46 because of the negative bias applied by the multivibrator 60 to the control grid of the triode in the gate circuit 62 after the termination of the pulse 100 on the plate of the right tube in the multivibrator 60.

The action of the inverted signal 108 on the multivibrator 56 causes the right tube to become cut off and a positive pulse to be produced on its plate for introduction to the grid of the right tube in the multivibrator 60. Upon the introduction of a positive pulse to the grid of its right tube, the multivibrator 60 becomes unbalanced in the same way as if a negative pulse is introduced to the grid of the left tube, and the left tube becomes cut off for a predetermined period of time to produce a positive pulse 110 on its plate similar to the pulses 86 and 100. At the end of the pulse 110, the multivibrator 58 produces a positive pulse 112 similar to the pulses 88 and 102. During the pulse 112, the multivibrator 66 produces nine signals, illustrated at 114, which are added in the counter 40 to the signals 90 and 104 and to the signals from the timer 32 to indicate the exact direction of the wind in the fourth quadrant.

As previously disclosed, the pulse 110 on the plate of the right tube in the multivibrator 60 is produced upon the termination of the positive pulse 106 on the plate of the left tube in the multivibrator 56. Because of the slight delay provided by the delay network 61, the pulse 110 is introduced to the control grid of the triode in the gate circuit 62 shortly after the formation of the negative pulse on the plate of the left tube in the multivibrator 56, this pulse being introduced to the control grid of the triode in the gate circuit 62. This slight delay prevents the pulse from the multivibrator 56 from passing through the gate circuit 62 to trigger the left tube in the multivibrator 46.

Sometimes the period of time between the pulses 22 and 24 is greater than 120 microseconds such that more than four pulses are produced by the timer 34. Since the fifth pulse from the timer is introduced to the multivibrator 56 before the termination of the pulse 86, the right tube in the multivibrator is still conducting. Thus, the fifth timer pulse cuts off the right multivibrator tube and causes the left tube to conduct. The resultant negative pulse on the plate of the left tube in the multivibrator, illustrated at 116, is introduced to the suppressor grid of the pentode in the gate circuit 72 to prevent any signals such as the signal 108 from passing through the gate circuit.

The negative pulse 116 is also introduced to the cathode of the triode in the gate circuit 62. Since the voltage on the control grid of the triode is relatively high because of the introduction of the positive pulse 86, the pulse 116 passes through the triode and cuts off the left tube in the multivibrator 46. The resultant negative pulse on the plate of the right tube in the multivibrator 46 is introduced to the control grid of the triode in the gate circuit 57 to prevent any triggering signals from passing through the gate circuit to the multivibrator 58. By preventing the multivibrator 58 from being triggered, the multivibrator 66 cannot be biased positively to produce the signals 90, 104 and 114. Since the production of five signals by the timer 34 is equivalent in angular rotation to the first quadrant, the prevention of any signal formation by the multivibrator 66 is desirable to produce a correct indication of wind direction in the counters 36, 40 and 44.

There is thus provided a system for operating on a plurality of pulses spaced by time periods indicative of the quadrant in which an angular quantity is located and of the position of the quantity in its quadrant. This system operates on the plurality of pulses to convert them into a direct indication of the position of the angular quantity relative to a fixed reference.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination with means for converting an angular quantity into a plurality of pulses spaced from one another by time periods indicative of the quadrant in which the quantity is located and of the relative position of the quantity in the quadrant, means for producing, between successive pairs of pulses indicative of the relative position of the quantity in its quadrant, a number of signals proportional to the time periods between pulses, means for converting the time periods between the pulses representing the quadrant into a plurality of signals indicative of the angular value represented by the quadrant, and means for combining the signals indicative of the quadrant with the signals indicative of the position in the quadrant to produce a resultant determination of the position of the angular quantity from a reference position.

2. In combination with means for converting an angular quantity into a plurality of pulses spaced from one another by time periods indicative of the quadrant in which the quantity is located and of the relative position of the quantity in the quadrant, means for converting the time periods between successive pairs of pulses indicative of the quantity in its quadrant into pluralities of signals proportional to the values of digits representing this position, means for converting the time period between the pulses indicative of the particular quadrant into a plurality of signals decimally proportional to the angular position of the quadrant relative to a reference position, and means for combining the last mentioned signals with a predetermined plurality of the first mentioned signals to provide a definite indication of the position of the variable quantity relative to the reference position.

3. In combination with means for converting an angular quantity into a plurality of pulses spaced from one another by time periods indicative of the quadrant in which the quantity is located and of the relative position of the quantity in the quadrant, means for converting the time periods between the pairs of successive pulses indicative of the position of the angular quantity in its quadrant into pluralities of signals proportional to the periods, means for converting the time period between the pair of pulses indicative of the quadrant into pluralities of signals representing the angular distance of the quantity from a fixed reference, and means for adding the last mentioned pluralities of signals to a predetermined one of the first mentioned pluralities of signals to provide a composite indication of the angular distance of the quantity from the fixed reference.

4. In combination with means for converting an angular quantity into a plurality of pulses spaced from one another by time periods indicative of the quadrant in which the quantity is located and of the relative position of the quantity in the quadrant, means for producing a plurality of equally spaced timing signals between each pair of pulses representing the position of the quantity in its quadrant, means for producing a plurality of timing signals for each quadrant represented by the spacing between a predetermined pair of pulses, means for combining the timing signals indicative of the quadrant with the corresponding timing signals indicative of the position of the quantity in the quadrant to produce a composite indication of the angular position of the quantity from a fixed reference, and means for preventing the formation of any timing signals indicative of the quadrant for quadrant indications involving more than a full revolution relative to the fixed reference.

5. In combination with means for converting an angular quantity into a plurality of pulses spaced from one another by time periods indicative of the quadrant in which the quantity is located and of the relative position of the quantity in the quadrant, means for producing between each pair of pulses indicative of the position of the quantity in its quadrant a number of signals proportional to the time periods between the pulses, means for producing a predetermined plurality of signals for each time interval of given magnitude during the period between the pair of pulses indicative of the quadrant in which the quantity is located, means for delaying the production of the last mentioned signals for a minimum period of time, means operative during the delay in the production of signals to prevent the formation of pluralities of signals corresponding to a full revolution of the angular quantity relative to a fixed reference, and means for combining the signals representing the quadrant with the signals representing the position in the quadrant to produce a composite indication of the position of the quantity from the fixed reference.

6. In combination with means for converting an angular quantity into a plurality of pulses spaced from one another by time periods indicative of the quadrant in which the quantity is located and of the relative position of the quantity in the quadrant, means for converting the time period between each pair of pulses indicative of the position of the quantity in its quadrant into a plurality of signals, each plurality being proportional to the value of a different digit indicating the position, means for producing a plurality of signals for each time interval of predetermined magnitude during the time period between the pair of pulses indicative of the quadrant, each plurality of signals corresponding to the digital scale mentioned above, means for delaying the production of the last mentioned signals for a minimum period of time, means operative during the delay time to quench the pluralities of signals indicative of a full revolution, and means for combining the signals indicative of the quadrant with the corresponding signals indicative of the position in the quadrant to form a composite indication in digital units of the angular position of the quantity relative to a fixed reference.

7. In combination with means for converting an angular quantity into a plurality of pulses spaced from one another by time periods indicative of the quadrant in which the quantity is located and of the relative position of the quantity in its quadrant, means operative to produce a timing signal after every interval of predetermined length during the period between successive pulses, means operative to introduce into separate channels the timing signals between each pair of successive pulses indicative of the angular position of the quantity in its quadrant, means operative by each timing signal between the pulses indicative of the quadrant to produce a predetermined plurality of signals, and means for introducing the pluralities of last mentioned signals to a particular one of the channels to produce in the channels pluralities of signals indicative of the position of the angular quantity from a fixed reference.

8. In combination with means for converting an angular quantity into a plurality of pulses spaced from one another by time periods indicative of the quantity in which the quantity is located and of the relative position of the quantity in its quadrant, means operative to produce a timing signal after every interval of predetermined length during the period between successive pulses, means operative to add in separate channels the timing signals between each pair of successive pulses indicative of the angular position of the quantity in its quadrant, means operative by each timing signal between the pulses indicative of the quadrant to produce a predetermined plurality of output signals, means operative after the introduction of a predetermined number of the last mentioned timing signals to prevent the production of any pluralities of output signals by the timing signals, and means for introducing the output signals to a particular one of the channels to produce in the channels pluralities of signals indicative of the position of the angular quantity from a fixed reference.

RENO V. BENAGLIO.
RAYMOND NYMBERG.

REFERENCES CITED

The following references are of record in the file of this patent:

UNITED STATES PATENTS

| Number | Name | Date |
|---|---|---|
| 1,708,989 | White | Apr. 16, 1929 |
| 2,418,521 | Morton et al. | Apr. 8, 1947 |
| 2,485,821 | Gloess et al. | Oct. 25, 1949 |
| 2,560,434 | Gloess et al. | July 10, 1951 |